(12) United States Patent
Walton et al.

(10) Patent No.: US 10,388,415 B2
(45) Date of Patent: Aug. 20, 2019

(54) SPACER GRID

(71) Applicant: BWXT mPower, Inc., Charlotte, NC (US)

(72) Inventors: Lewis A. Walton, Forest, VA (US); George S. Pabis, Lynchburg, VA (US); Andrew W. Doan, Lynchburg, VA (US); James G. Hatmaker, Lynchburg, VA (US)

(73) Assignee: BWXT mPower, Inc., Charlotte, NC (US)

( * ) Notice: Subject to any disclaimer, the term of this patent is extended or adjusted under 35 U.S.C. 154(b) by 89 days.

(21) Appl. No.: 15/483,352

(22) Filed: Apr. 10, 2017

(65) Prior Publication Data

US 2017/0213605 A1 Jul. 27, 2017

Related U.S. Application Data

(62) Division of application No. 13/364,769, filed on Feb. 2, 2012, now Pat. No. 9,620,250.

(51) Int. Cl.
*G21C 3/34* (2006.01)
*G21C 3/352* (2006.01)
*G21C 3/356* (2006.01)

(52) U.S. Cl.
CPC .............. *G21C 3/352* (2013.01); *G21C 3/34* (2013.01); *G21C 3/356* (2013.01); *G21C 3/3563* (2013.01); *Y02E 30/40* (2013.01)

(58) Field of Classification Search
CPC ........ G21C 3/34; G21C 3/3408; G21C 3/352; G21C 3/356; G21C 3/3563
See application file for complete search history.

(56) References Cited

U.S. PATENT DOCUMENTS 3,379,617 A 4/1968 Andrews et al.
3,844,887 A 10/1974 Georges et al.
(Continued)

FOREIGN PATENT DOCUMENTS

CN 85109766 A 7/1986
CN 86102224 A 11/1986
(Continued)

OTHER PUBLICATIONS

Chinese Office Action dated Mar. 4, 2016 for Chinese Application No. 201210557290.0.
(Continued)

*Primary Examiner* — Sharon M Davis
(74) *Attorney, Agent, or Firm* — Nelson Mullins Riley & Scarborough LLP

(57) ABSTRACT

A spacer grid includes interlocked straps comprising metal sheets or plates welded together to define a spacer grid having a top and bottom. The interlocked straps define a plurality of cells comprising vertical passages connecting the top and bottom of the spacer grid. The cells include: upper dimples proximate to the top of the spacer grid and distal from the mid-plane of the spacer grid; lower dimples proximate to the bottom of the spacer grid and distal from the mid-plane of the spacer grid; cantilevered upper springs having fuel rod engagement surfaces proximate to the top of the spacer grid and distal from the mid-plane of the spacer grid; and cantilevered lower springs having fuel rod engagement surfaces proximate to the bottom of the spacer grid and distal from the mid-plane of the spacer grid.

11 Claims, 10 Drawing Sheets

(56) References Cited

U.S. PATENT DOCUMENTS

| | | | |
|---|---|---|---|
| 3,933,584 A | 1/1976 | Litt | |
| 4,030,975 A | 6/1977 | Anthony et al. | |
| 4,143,276 A | 3/1979 | Mollon | |
| 4,187,433 A | 2/1980 | Zezza | |
| 4,357,298 A * | 11/1982 | Wolters, Jr. | G21C 3/3566 376/441 |
| 4,396,573 A | 8/1983 | Feutrel | |
| 4,594,216 A | 6/1986 | Feutrel | |
| 4,702,881 A | 10/1987 | Weiland et al. | |
| 4,744,942 A | 5/1988 | Ferrari et al. | |
| 4,844,861 A | 7/1989 | Leclercq | |
| 4,885,127 A | 12/1989 | Yokoyama | |
| 4,895,698 A | 1/1990 | DeMario | |
| 4,923,669 A | 5/1990 | DeMario | |
| 4,957,697 A | 9/1990 | Wada | |
| 4,966,745 A | 10/1990 | Widener et al. | |
| 4,990,304 A | 2/1991 | Rylatt | |
| 4,994,233 A | 2/1991 | Freeman | |
| 4,996,018 A | 2/1991 | Bhatt et al. | |
| 5,009,837 A | 4/1991 | Nguyen et al. | |
| 5,024,806 A | 6/1991 | Cioffi et al. | |
| 5,030,413 A | 7/1991 | Knierriem et al. | |
| 5,043,134 A | 8/1991 | Widener et al. | |
| 5,068,083 A | 11/1991 | John, Jr. et al. | |
| 5,158,740 A | 10/1992 | Boatwright | |
| 5,207,980 A | 5/1993 | Gilmore et al. | |
| 5,247,551 A | 9/1993 | van Swam | |
| 5,265,137 A | 11/1993 | Busch | |
| 5,268,948 A | 12/1993 | Church et al. | |
| 5,282,231 A | 1/1994 | Adams et al. | |
| 5,282,233 A | 1/1994 | Bryan | |
| 5,299,246 A | 3/1994 | Bryan | |
| 5,363,422 A | 11/1994 | Nylund et al. | |
| 5,367,549 A | 11/1994 | Hatfield | |
| 5,436,945 A | 7/1995 | Weisel et al. | |
| 5,513,234 A | 4/1996 | Rottenberg | |
| 5,640,434 A | 6/1997 | Rottenberg | |
| 5,732,116 A | 3/1998 | Petit | |
| 5,757,874 A | 5/1998 | Croteau et al. | |
| 6,055,288 A | 4/2000 | Schwirian | |
| 6,088,420 A | 7/2000 | Yokoyama et al. | |
| 6,130,927 A | 10/2000 | Kang et al. | |
| 6,275,557 B2 | 8/2001 | Nylund et al. | |
| 6,636,578 B1 | 10/2003 | Clark | |
| 6,636,580 B2 | 10/2003 | Murakami et al. | |
| 6,714,619 B2 | 3/2004 | Oh et al. | |
| 6,721,384 B2 | 4/2004 | Oh et al. | |
| 6,744,843 B2 | 6/2004 | Kang et al. | |
| 6,810,099 B2 | 10/2004 | Nakamaru et al. | |
| 6,819,733 B2 | 11/2004 | Broders et al. | |
| 6,865,242 B2 | 3/2005 | Barbe et al. | |
| 6,895,067 B2 | 5/2005 | Borum et al. | |
| 7,085,340 B2 | 8/2006 | Goldenfield et al. | |
| 7,257,185 B1 | 8/2007 | Yamada et al. | |
| 7,280,946 B2 | 10/2007 | Russell, II et al. | |
| 7,424,412 B2 | 9/2008 | Kropaczek et al. | |
| 7,428,479 B2 | 9/2008 | Boer et al. | |
| 7,453,972 B2 | 11/2008 | Hellandbrand, Jr. et al. | |
| 7,469,030 B2 | 12/2008 | Bonnamour et al. | |
| 7,526,058 B2 | 4/2009 | Fawcett et al. | |
| 7,548,602 B2 | 6/2009 | Smith, III et al. | |
| 7,561,654 B2 | 7/2009 | Makovicka et al. | |
| 7,574,337 B2 | 8/2009 | Kropaczek et al. | |
| 7,623,612 B2 | 11/2009 | Marzean et al. | |
| 7,668,280 B2 | 2/2010 | Hellandbrand, Jr. et al. | |
| 7,668,284 B2 | 2/2010 | Sparrow et al. | |
| 7,769,125 B2 | 8/2010 | Yoon et al. | |
| 7,835,484 B2 | 11/2010 | Eom et al. | |
| 9,620,250 B2 | 4/2017 | Walton et al. | |
| 2003/0123600 A1 | 7/2003 | Hesketh et al. | |
| 2003/0169839 A1 | 9/2003 | Matteson | |
| 2005/0069080 A1 | 3/2005 | Goldenfield et al. | |
| 2006/0153327 A1 | 7/2006 | Jiang | |
| 2006/0222140 A1 | 10/2006 | Aleshin et al. | |
| 2006/0251205 A1 | 11/2006 | Balog | |
| 2007/0133732 A1 | 6/2007 | Nakayama et al. | |
| 2007/0206717 A1 | 9/2007 | Conner et al. | |
| 2007/0223646 A1 * | 9/2007 | Marzean | G21C 3/3408 376/438 |
| 2008/0084957 A1 | 4/2008 | Aleshin et al. | |
| 2009/0032178 A1 | 2/2009 | Feinroth | |
| 2010/0098208 A1 | 4/2010 | Eom et al. | |
| 2011/0103539 A1 | 5/2011 | Agueda et al. | |
| 2011/0200160 A1 | 8/2011 | Evans et al. | |

FOREIGN PATENT DOCUMENTS

| | | |
|---|---|---|
| CN | 1140885 A | 1/1997 |
| CN | 101377964 A | 3/2009 |
| GB | 2181292 A | 4/1987 |
| JP | H03-160398 B2 | 4/2001 |

OTHER PUBLICATIONS

European Search Report dated Jun. 24, 2015 for EP Application No. 13784959.2.

International Search Report and Written Opinion dated Sep. 20, 2013 for PCT/US2013/022666.

Office Action dated Mar. 15, 2016 for EP Application No. 13784959.2.

Second Office Action dated Sep. 20, 2016 for Chinese Patent Application No. 201210557290.0 X.

Canadian Office Action, CA Application No. 2,863,160, dated Nov. 9, 2018, 4 pages.

* cited by examiner

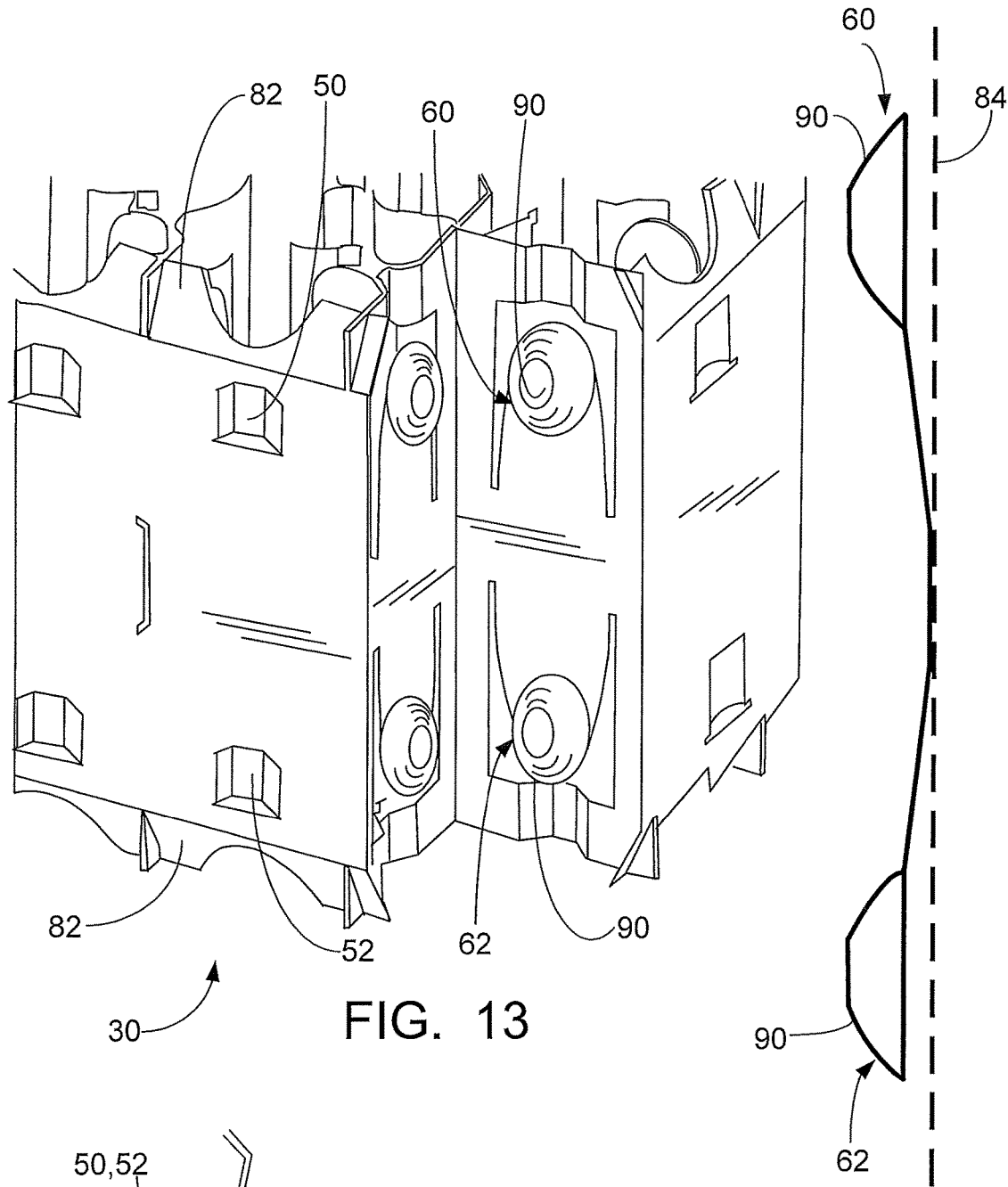
FIG. 13
FIG. 15
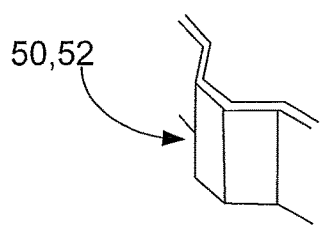
FIG. 14

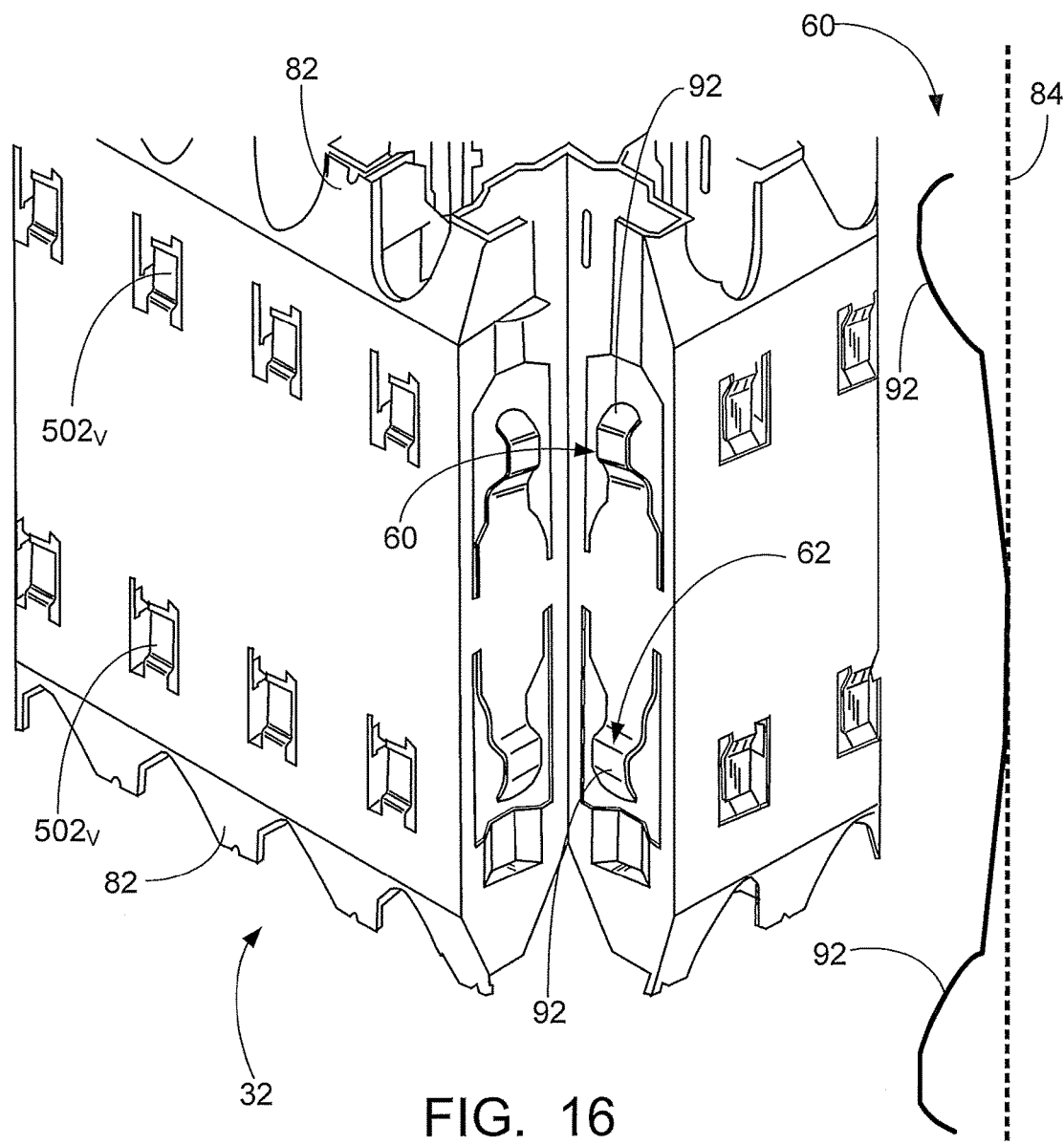
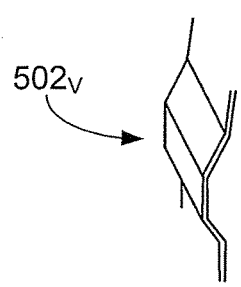
FIG. 16
FIG. 17
FIG. 18

SPACER GRID

CLAIM OF PRIORITY

This application is a divisional of U.S. patent application Ser. No. 13/364,769 filed Feb. 2, 2012, now U.S. Pat. No. 9,620,250, the entire disclosure of which is incorporated by reference herein.

BACKGROUND

The following relates to the nuclear power reactor arts, fuel assembly construction arts, and related arts.

With reference to FIG. 1, a nuclear reactor of the pressurized water reactor (PWR) variety includes a pressure vessel 10 containing primary coolant, such as primary coolant water. The illustrative pressure vessel 10 is a cylindrical pressure vessel (where "cylindrical" is intended to encompass deviations from a mathematically perfect cylinder such as the illustrative non-uniform diameter of the illustrative cylindrical pressure vessel 10, the inclusion of vessel penetrations, support structures, or so forth). A nuclear reactor core 12 is disposed at or near the bottom of the pressure vessel 10. (Note that in diagrammatic FIG. 1 the pressure vessel 10 is partially cut away as indicated by a dashed "opening" in order to reveal the reactor core 12 disposed inside. Moreover, diagrammatic FIG. 1 omits mounting features such as a core basket that typically are provided to secure the reactor core 12 inside the pressure vessel 10). Although a PWR is shown in FIG. 1 by way of illustrative example, it is to be understood that the spacer grids disclosed herein are suitably used in nuclear reactors of various varieties, such as PWR, boiling water reactor (BWR), and so forth.

The nuclear reactor core 12 typically comprises a plurality of fuel assemblies arranged in a closely-packed array. The fuel assembly includes a bundle of vertically oriented fuel rods each comprising a fissile material such as $^{235}U$. For example, each fuel rod may contain enriched uranium dioxide ($UO_2$) or mixed $UO_2$/gadolinium oxide ($UO_2$—$Gd_2O_3$) pellets. Interspersed amongst the fuel rods are guide tubes that provide conduits for control rods, instrumentation, or so forth. The top of the fuel assembly is terminated by an upper end fitting or nozzle and the bottom of the fuel assembly is terminated by a lower end fitting or nozzle. The fuel assembly is held together by a plurality of spacer grids including end grids disposed at the top and bottom of the fuel assembly and one or (typically) more mid-grids disposed at spaced apart positions between the top and bottom of the fuel assembly.

Conventional spacer grids are formed by interlocking orthogonally oriented metal straps made of sheet metal to define a two-dimensional grid of square or rectangular spaces, also called grid "cells", with each cell being delineated by four straps. Alternatively, a hexagonal arrangement can be employed in which each cell is generally hexagonal and is delineated by six straps. In one suitable approach employing square cells for receiving fuel rods, the strap portions defining each cell have two dimples formed from the grid straps that form two adjacent walls of the cell. One dimple in each pair is located near the top of the grid strap and the other is located near the bottom of the grid strap. The opposite walls of the cell each contain a single spring which may be formed from the strap that makes that cell wall, or may be an insert made of a different material that is mechanically trapped or restrained by features formed from the strap that make up that cell wall. The springs are located at or near the mid-plane of the spacer grid, and are sized such that an interference condition exists when a fuel rod is inserted into the grid cell. This interference causes the springs to deflect backwards towards the cell walls on which they are located, preloading the fuel rod in two orthogonal directions against the opposing dimple pair and clamping it in position. The axial offset between the plane of action of the springs and the plane of action of the dimples creates restoring moments that cause the local vertical orientation of the fuel rod at the spacer grids to remain relatively fixed should lateral forces be applied to the fuel rod between any two axially adjacent spacer grids. In some approaches, each spring contacts its fuel rod at two locations along the length of horizontal or vertical folds in the spring convolutes. Sometimes local flats, and/or secondary arches, are also provided to spread out any wear should the fuel rod oscillate in service due to flow-induced vibration. The straps in a conventional spacer grid are typically oriented such that the springs in a given cell are on the outboard walls of the cell and the dimples are on the inboard walls of the cell. This arrangement has the advantage of providing a rigid foundation to resist any inward-acting forces that may be applied to the outer row of fuel rods should the fuel assembly contact a neighboring fuel assembly or other adjacent structure during handling.

BRIEF SUMMARY

In one aspect of the disclosure, a fuel assembly comprises a bundle of fuel rods comprising fissile material, and a spacer grid securing the fuel rods of the bundle together. The spacer grid has a top and a bottom and includes a plurality of cells comprising passages from the top to the bottom of the spacer grid through which fuel rods pass. The cells include: upper dimples disposed proximate to the top of the spacer grid and distal from the mid-plane of the spacer grid; lower dimples disposed proximate to the bottom of the spacer grid and distal from the mid-plane of the spacer grid; upper cantilevered springs having cantilevered free ends located above the mid-plane of the spacer grid; and lower cantilevered springs having cantilevered free ends located below the mid-plane of the spacer grid. The upper cantilevered springs of each cell bias the fuel rod passing through the cell against the upper dimples of the cell and the lower cantilevered springs of each cell bias the fuel rod passing through the cell against the lower dimples of the cell.

In some fuel assembly embodiments as set forth in the immediately preceding paragraph, the spacer grid comprises interlocked straps comprising metal sheets or plates, and the outermost straps of the spacer grid do not include upper cantilevered springs and do not include lower cantilevered springs. In some fuel assembly embodiments as set forth in the immediately preceding paragraph, the upper and lower dimples face inward toward the center of the spacer grid and the upper and lower cantilevered springs face outward away from the center of the spacer grid. In some fuel assembly embodiments as set forth in the immediately preceding paragraph, the upper dimples extend to the top of the spacer grid and the lower dimples extend to the bottom of the spacer grid.

In another aspect of the disclosure, a spacer grid includes interlocked straps comprising metal sheets or plates welded together to define a spacer grid having a top and bottom. The interlocked straps define a plurality of cells comprising vertical passages connecting the top and bottom of the spacer grid. The cells include: upper dimples disposed proximate to the top of the spacer grid and distal from the mid-plane of the spacer grid; lower dimples disposed proximate to the bottom of the spacer grid and distal from the mid-plane of the spacer grid; cantilevered upper springs having fuel rod engagement surfaces disposed proximate to the top of the spacer grid and distal from the mid-plane of the spacer grid; and cantilevered lower springs having fuel rod engagement surfaces disposed proximate to the bottom of the spacer grid and distal from the mid-plane of the spacer grid.

In some spacer grid embodiments as set forth in the immediately preceding paragraph, the cantilevered upper springs have cantilever anchors proximate to the mid-plane of the spacer grid and distal from the top of the spacer grid, and the cantilevered lower springs have cantilever anchors proximate to the mid-plane of the spacer grid and distal from the bottom of the spacer grid. In some spacer grid embodiments as set forth in the immediately preceding paragraph, the cantilevered upper springs have cantilever anchors located at or below the mid-plane of the spacer grid, and the cantilevered lower springs have cantilever anchors located at or above the mid-plane of the spacer grid. In some spacer grid embodiments as set forth in the immediately preceding paragraph, the fuel rod engagement surfaces of the cantilevered upper and lower springs comprise flat-topped domes. In some spacer grid embodiments as set forth in the immediately preceding paragraph, the outermost straps of the interlocked straps do not include cantilevered upper springs and do not include cantilevered lower springs.

In some spacer grid embodiments as set forth in the immediately preceding paragraph, the set of dimples includes a set of upper dimples configured to contact fuel rods above the mid-plane of the spacer grid and a set of lower dimples configured to contact fuel rods below the mid-plane of the spacer grid, and the set of springs includes a set of upper springs configured to contact fuel rods above the mid-plane of the spacer grid and a set of lower springs configured to contact fuel rods below the mid-plane of the spacer grid.

In another aspect of the disclosure, a spacer grid comprises: interlocked straps of metal sheets or plates welded together to form a spacer grid having a top and bottom, the interlocked straps defining a plurality of cells comprising vertical passages connecting the top and bottom of the spacer grid; and a fuel rods retention system comprising a set of dimples protruding from walls of the cells and a set of springs protruding from walls of the cells. The set of dimples does not include any dimples configured to contact fuel rods at the mid-plane of the spacer grid. The set of springs does not include any springs configured to contact fuel rods at the mid-plane of the spacer grid.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

FIG. 6 diagrammatically shows the arrangement of straps along one direction for the spacer grid embodiment. FIG. 7 shows a perspective view of the spacer grid embodiment.

FIG. 8 diagrammatically shows the arrangement of straps along one direction for the spacer grid embodiment. FIG. 9 shows a perspective view of the spacer grid embodiment.

FIG. 10 shows a perspective view of the spacer grid embodiment. FIG. 11 shows a plan view of an interior strap of the spacer grid embodiment. FIG. 12 shows a plan view of an outermost strap of the spacer grid embodiment.

FIGS. 13-15 illustrate an end-grid embodiment. FIG. 13 shows a perspective view of one corner of the end-grid with the extreme corner cell removed to reveal interior components. FIG. 14 shows a diagrammatic perspective view of one of the horizontally oriented dimples. FIG. 15 shows a diagrammatic side view of a pair of upper/lower springs of the end-grid.

FIGS. 16-18 illustrate a mid-grid embodiment. FIG. 16 shows a perspective view of one corner of the mid-grid with the extreme corner cell removed to reveal interior components. FIG. 17 shows a diagrammatic perspective view of one of the vertically oriented dimples disposed on the outermost straps of the mid-grid. FIG. 18 shows a diagrammatic side view of a pair of upper/lower springs of the mid-grid.

DETAILED DESCRIPTION OF THE PREFERRED EMBODIMENTS

Figure 1:
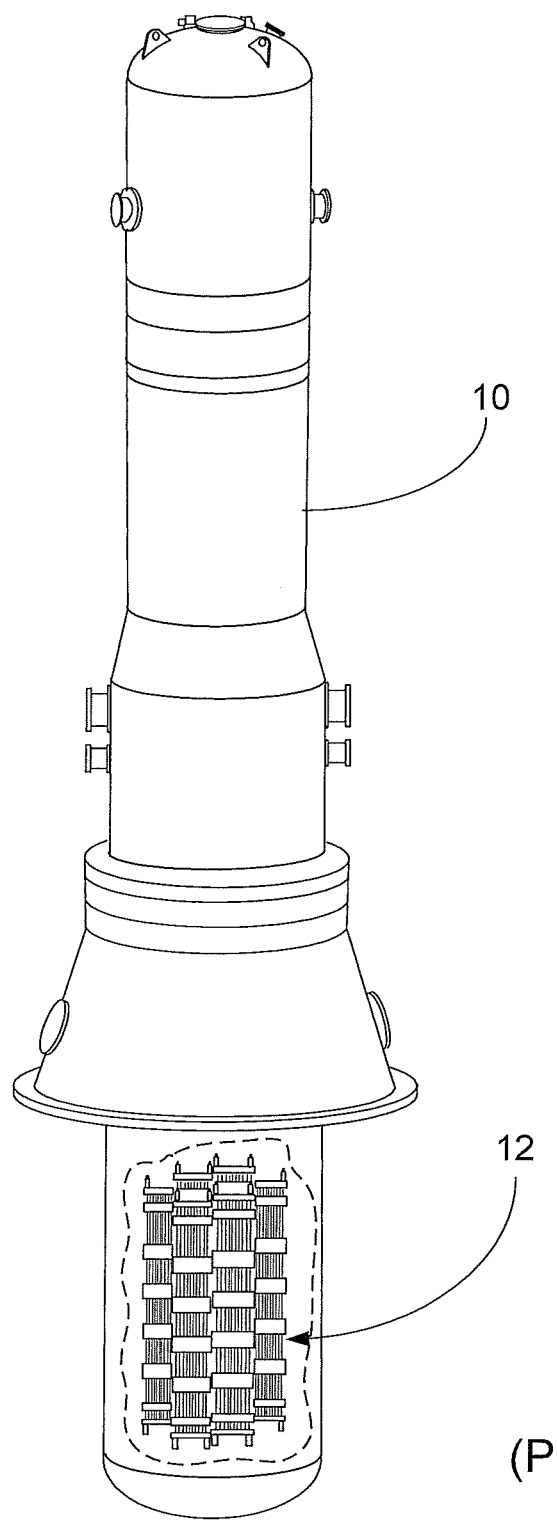
FIG. 1 diagrammatically shows a side sectional view of a pressurized water reactor (PWR) according the prior art.

As already set forth, in conventional spacer grids the axial offset between the plane of action of the springs (i.e., soft stops) and the plane of action of the dimples (i.e., hard stops) creates restoring moments that advantageously cause the local vertical orientation of the fuel rod at the spacer grids to remain relatively fixed should lateral forces be applied to the fuel rod between any two axially adjacent spacer grids. However, it is recognized herein that this same offset of the plane of action also induces a bending moment at each spacer grid that causes the fuel rod to bow in the span between any two axially adjacent spacer grids. While this initial bowing may be tolerable, it may be enhanced by irradiation-induced creep effects during service, potentially resulting in problematic partial or complete closure of the adjacent coolant channels and consequent localized heating.

The conventional orientation of the springs and dimples with the springs in a given cell being on the outboard walls and the dimples on the inboard walls advantageously facilitates resistance to any inward-acting forces that may be applied to the outer row of fuel rods. However, this arrangement places springs on the outermost strap of the spacer grid, which significantly weakens the outermost straps. This can adversely impact the strength of the overall spacer grid structure. It is known to at least partially compensate for this weakness by using a thicker outer strap compared with the inner straps, and/or via by adding stiffening ribs and other mechanical features to the outermost strap. However, these approaches result in the springs of the outermost strap having different (typically higher) spring rates as compared with the springs of the interior straps, which enhances the fuel rod bowing effect for the outermost fuel rods of the fuel assembly, and can lead to excessive in-service fuel rod bow in the outermost row of the fuel rod array.

The centralized location of the springs at or near the mid-plane of the spacer grid is also recognized herein to cause problems. If the folds of the springs are oriented vertically, then each spring will actually contact the fuel rod at only a single point if there is any misalignment of the fuel rod due to manufacturing tolerances. This negates the intended benefit of spreading out the contact surface, and can result in high local bearing stresses that potentially lead to rapid local wear if the fuel rod vibrates in service. Vertically oriented folds also present a problem during rod loading as they can result in excessive scratching of the cladding and/or hang-up of the fuel rod and grid damage. A coining operation is typically applied on the leading and trailing edges of the spring contacts to ameliorate these problems but it has limited benefit.

On the other hand, if the folds are horizontally oriented, the upstream and downstream spring surfaces typically provide adequate lead-in, so cladding scratching and rod hang-up are less of a concern. However, this orientation provides more local flow blockage, which is less desirable from a thermal-hydraulic point of view.

Disclosed herein is a dual cantilever spring arrangement that moves the contact surfaces between the spring and the fuel rod away from the mid-plane of the space grid, and hence toward proximate dimples located near the top and bottom, respectively, of the grid strap. The dual cantilever configuration combined with the resulting near-alignment of the respective planes of action of the springs (i.e., soft stops) and the opposing dimples (i.e., hard stops) substantially reduces the induced fuel rod bow. The cantilevered springs can also be constructed with low stiffness (i.e., low spring rate). Some disclosed embodiments also place the springs on the inboard walls of the cells (with the springs facing outward), with the dimples located on the outboard walls (and facing inward). This orientation eliminates the spring cutouts on the outermost strap which substantially strengthens the spacer grid during lateral impacts.

Figure 2:
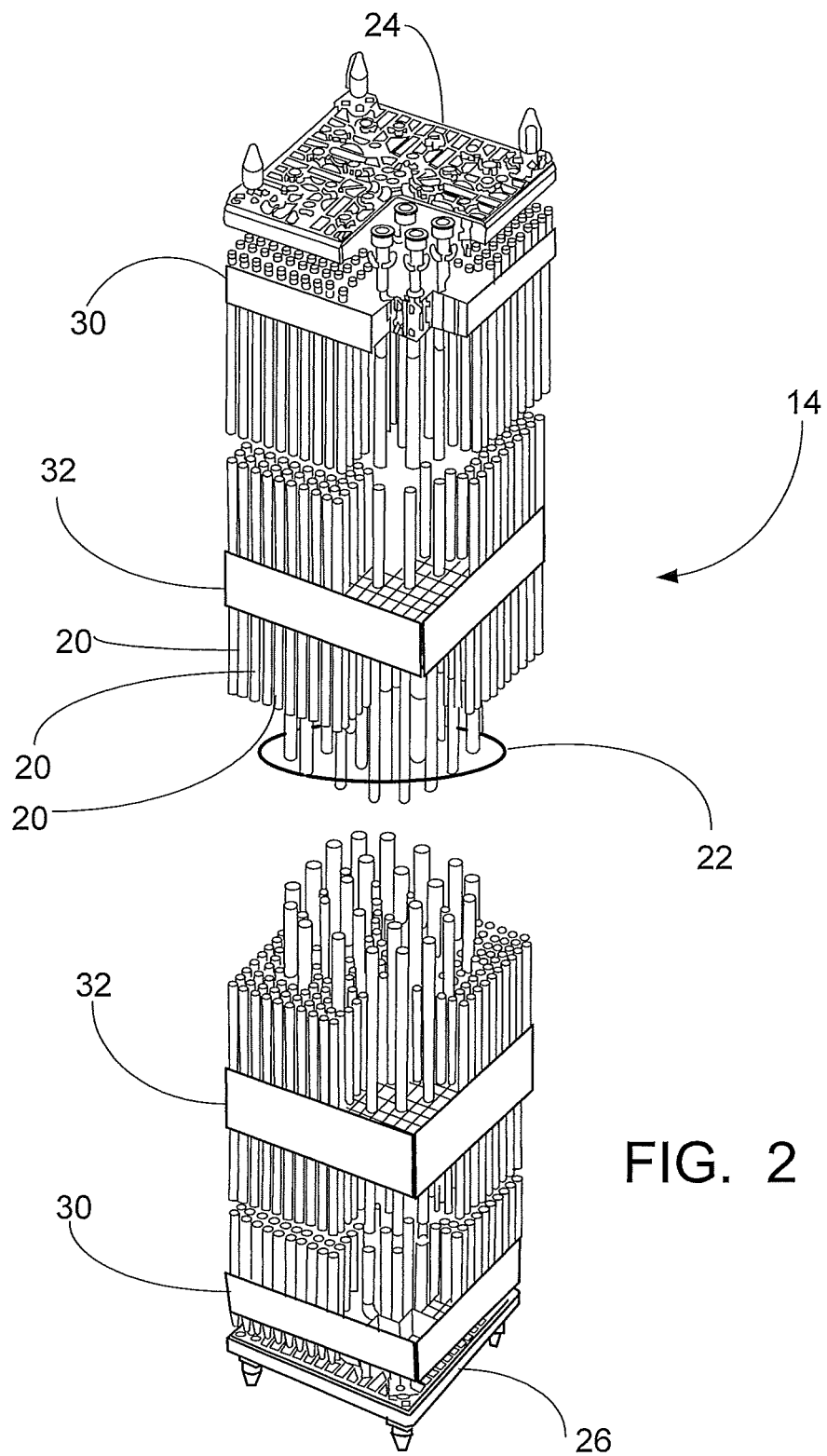
FIG. 2 diagrammatically shows an exploded view of a single fuel assembly employing spacer grids as disclosed herein.

With reference to FIG. 2, a representative fuel assembly 14 is diagrammatically shown with partial breakaway and the front top corner of the perspective view cut away to reveal internal components. The fuel assembly 14 is suitably employed as an element of the nuclear reactor core 12 disposed in the pressure vessel 10 of FIG. 1. The fuel assembly 14 includes an array of vertically oriented fuel rods 20 each comprising a fissile material such as $^{235}$U. For example, each fuel rod may contain enriched uranium dioxide ($UO_2$) or mixed $UO_2$/gadolinium oxide ($UO_2$—$Gd_2O_3$) pellets. Interspersed amongst the fuel rods 20 are guide tubes 22 that provide conduits for control rods, instrumentation, or so forth. The top of the fuel assembly 14 is terminated by an upper end fitting or nozzle 24 and the bottom of the fuel assembly 14 is terminated by a lower end fitting or nozzle 26.

The fuel assembly 14 is held together by a plurality of spacer grids including end grids 30 disposed at the top and bottom of the fuel assembly 14 and one or (typically) more mid-grids 32 disposed at spaced apart positions between the top and bottom of the fuel assembly 14. (Said another way, each end spacer grid 30 is closer to an end of the bundle of fuel rods 20 than the mid-grid 32). Illustrative FIG. 2 shows only two mid-grids 32, but typically additional mid-grids are present which are omitted in the cutaway illustration. The number of mid-grids, and the spacing of the end grids and mid grids along the height of the fuel assembly, is determined based on the total length of the bundle of fuel rods, the total number of fuel rods in the bundle, the structural characteristics of the fuel rods, applicable regulatory requirements, and so forth.

Figure 3:
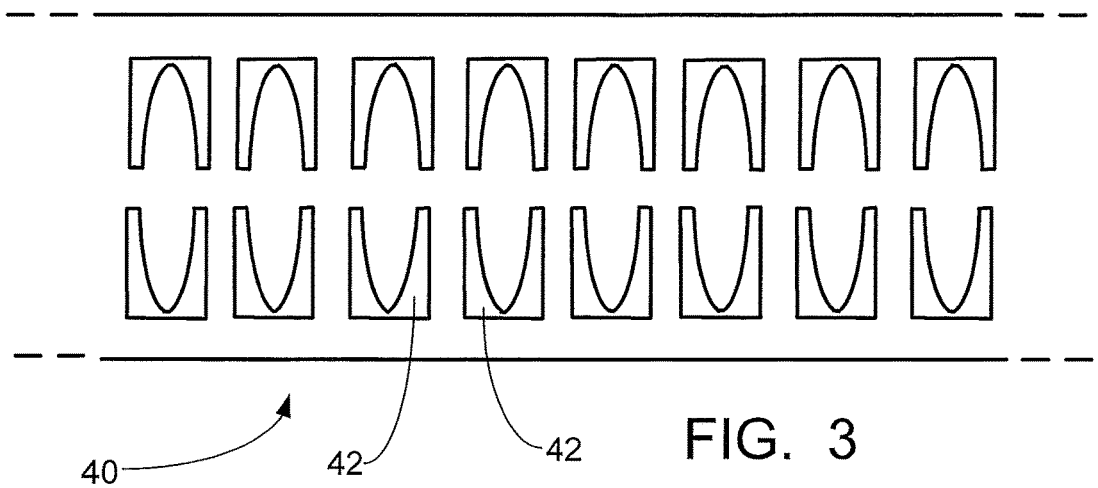
FIG. 3 diagrammatically shows a metal sheet or plate undergoing fabrication to form a strap of a spacer grid, wherein cutaways delineating springs have been formed in the metal sheet or plate.
Figure 4:
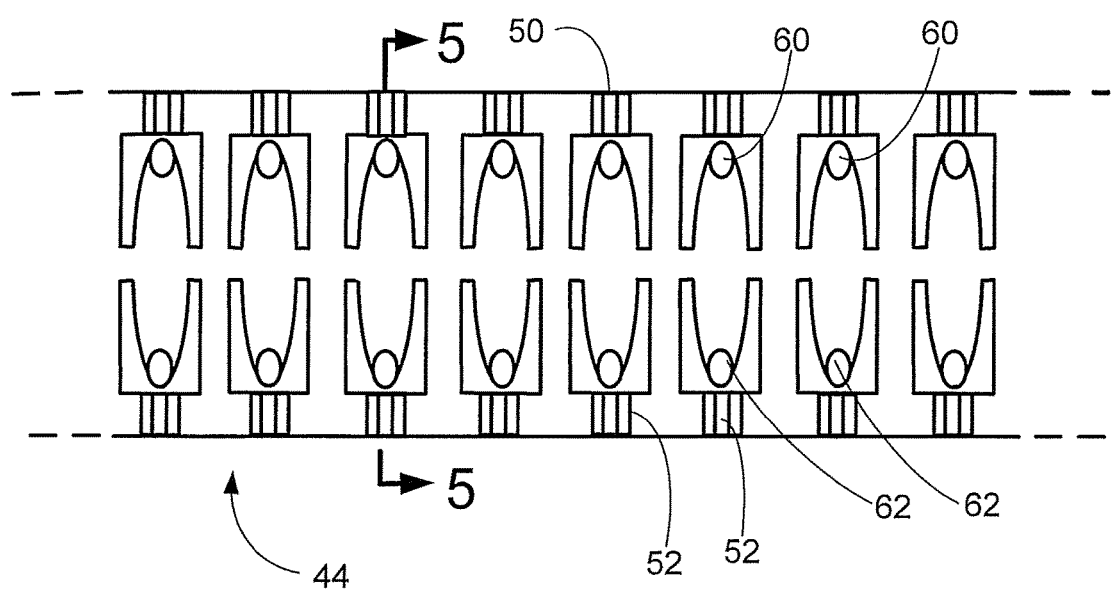
FIG. 4 diagrammatically shows a strap formed from the metal sheet or plate of FIG. 3.
Figure 5:
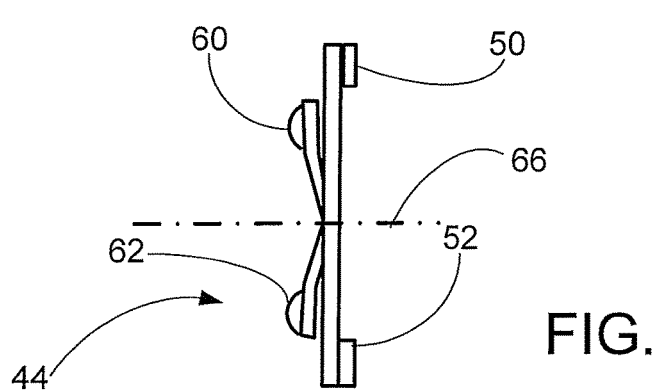
FIG. 5 diagrammatically shows Section A-A indicated in FIG. 4.
Figure 6:
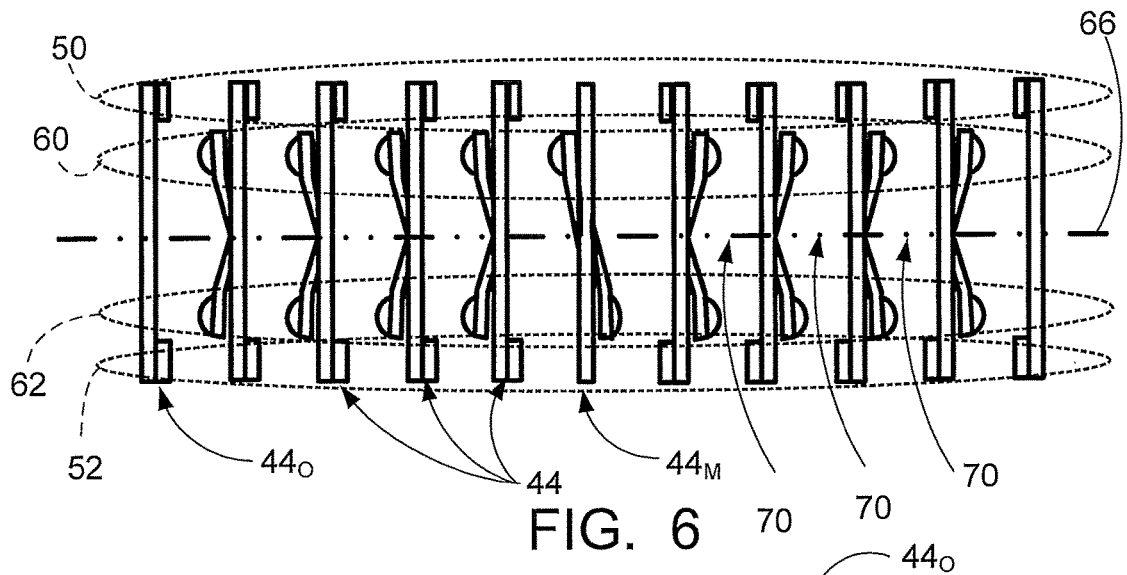
FIGS. 6 and 7 illustrate a first spacer grid embodiment.
Figure 7:
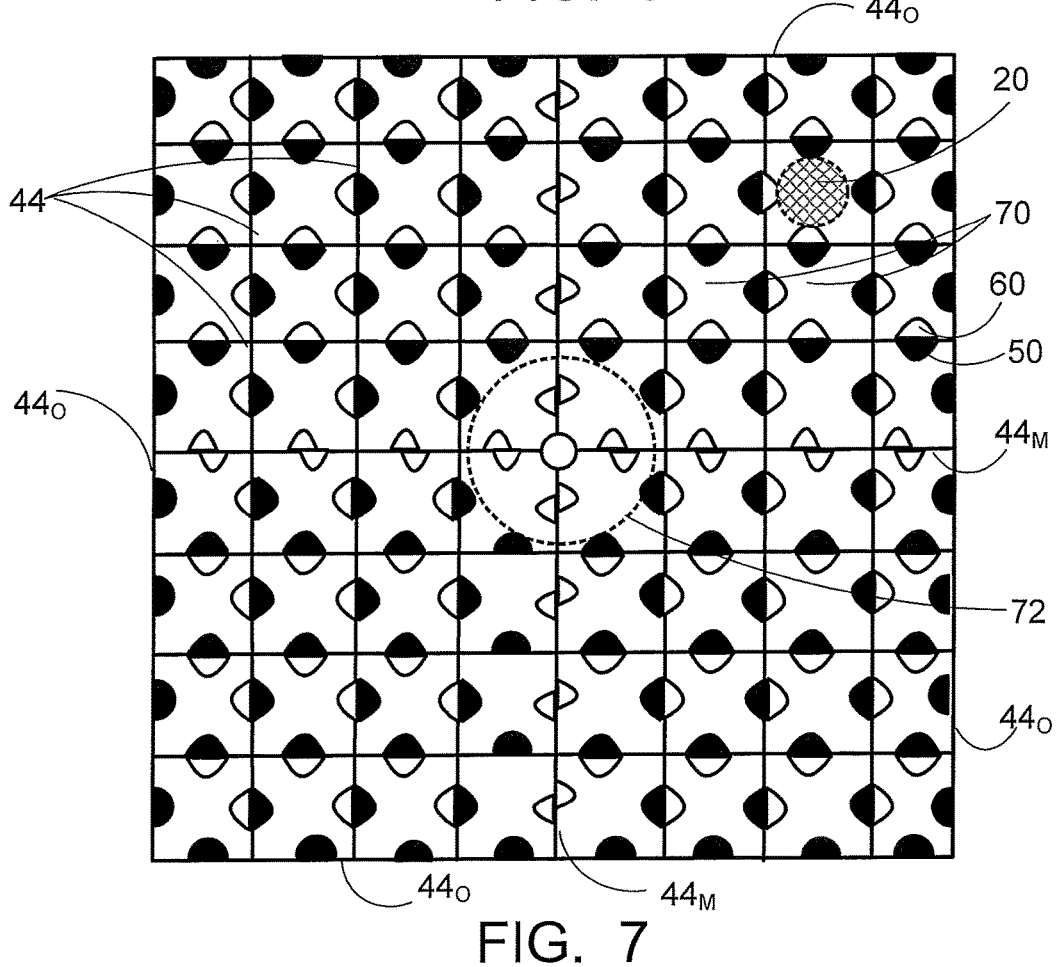

With reference to FIGS. 3-7, an illustrative spacer grid is diagrammatically shown. FIG. 3 shows a metal sheet or plate 40 with cutaways 42 for defining the springs. The metal sheet or plate 40 may, for example, be formed by suitable metal working techniques such as rolling. The metal may be a nickel-chromium alloy (e.g., Inconel), or a zirconium alloy (e.g., Zircaloy), or so forth. Inconel is stronger than Zircaloy; however, Zircaloy has a smaller neutron absorption cross-section as compared with Inconel. Thus, in some embodiments the end grids 30 are made of Inconel while the mid-grids 32 are made of Zircaloy. The cutaways 42 comprise removed portions of the metal sheet or plate, and may be formed by mechanical cutting, laser cutting, or so forth. The cutaways 42 define "templates" for the springs. FIGS. 4 and 5 show plan and side sectional views, respectively, of an interior strap 44 with: upper dimples 50; lower dimples 52; upper springs 60; and lower springs 62. These dimples 50, 52 and springs 60, 62 are formed by suitable deformation of the sheet or plate metal using a press or other sheet metal forming apparatus. FIGS. 6 and 7 show side sectional and top views, respectively, of the spacer grid comprising interlocked straps 44. As seen in the top view of FIG. 7, straps are arranged in two orthogonal directions to form a two-dimensional grid of cells 70 through which fuel rods (represented by single illustrative fuel rod 20 diagrammatically shown in FIG. 7) pass and are retained by the dimples 50, 52 and springs 60, 62. (Note that in the top view of FIG. 7, only the upper dimples 50, represented by filled spherical caps, and upper springs 60, represented by open spherical caps, are visible). The straps are interlocked using mating slots (not shown) that are formed into the straps at the same time the cutaways 42 are formed. Typically, an assembly jig (not shown) is used to temporarily hold the straps during assembly of the interlocked structure, and the mating slots are welded to produce the final stand-alone rigid spacer grid structure.

With particular reference to FIG. 6, the resulting spacer grid has a top at which are disposed the upper features 50, 60, and a bottom at which are disposed the lower features 52, 62. A mid-plane 66 of the spacer grid is located midway between the top and bottom of the spacer grid. With particular reference to FIG. 5, the springs 60, 62 are formed as cantilevered springs. That is, each upper spring 60 is anchored to the spacer grid at or above the mid-plane 66 of the spacer grid and has a cantilevered free end that extends "upward" toward the top of the spacer grid; while each lower spring 62 is anchored to the spacer grid at or below the mid-plane 66 of the spacer grid and has a cantilevered free end that extends "downward" toward the bottom of the spacer grid. With reference to FIG. 5, this results in an upper "grip plane" containing the upper features 50, 60, and a lower "grip plane" containing the lower features 52, 62. (The upper grip plane is not mathematically exact because the array of upper dimples 50 is not precisely coplanar with the array of upper springs 60, and similarly for the lower grip plane). The springs 60, 62 do not contact the fuel rods 20 at the mid-plane 66 of the spacer grid; rather, the upper springs 60 contact the fuel rods above the mid-plane 66 and proximate to the upper dimples 50; and similarly the lower springs 62 contact the fuel rods below the mid-plane 66 and proximate to the lower dimples 52.

This dual cantilever configuration combined with the resulting near-alignment of the respective planes of action of the upper springs 60 and opposing dimples 50 in the upper grip plane and the resulting near-alignment of the respective planes of action of the lower springs 62 and opposing dimples 52 in the lower grip plane substantially reduces the induced fuel rod bow. The cantilevered springs 60, 62 can also be constructed with low stiffness (i.e., low spring rate), with the stiffness being controlled by the dimensions, e.g. width and length, of the cantilever (defined by the detailed shape of the cutaways 42) and the thickness and elasticity of the metal sheet or plate. Since there are two springs 60, 62, each can have lower stiffness as compared with an arrangement employing a single (higher stiffness) spring.

With particular reference to FIGS. 6 and 7, in addition to the interior straps 44, there are two types of "special" straps: four outer straps $44_O$ forming the outer boundaries of the spacer grid; and two mid-straps $44_M$ that intersect at the center of the spacer grid. In the illustrative example of FIGS. 6 and 7, the outer straps $44_O$ differ from the interior straps 44 in that they do not include springs 60, 62. As a consequence, the cutaways 42 (see FIG. 3) are not formed into the metal sheets or plates from which the outer straps $44_O$ are fabricated, and so less metal is removed. This enhances the strength of the outer straps $44_O$, which in turn enhances the strength of the overall spacer grid structure. In keeping with this configuration for the outer straps $44_O$, and as seen in FIGS. 6 and 7, the dimples 50, 52 are all arranged on outboard walls of the cells 70, that is, with the dimples facing "inward", while the opposing springs 60, 62 are all arranged on inboard walls of the cells 70, that is, with the springs facing "outward". This design paradigm ideally would place springs on both opposing sides of the mid-strap. However, as seen in FIGS. 3-5 the springs 60, 62 are formed by making the cutaways 42 and then deforming the remaining metal into the cell 70 upon which it is to act. There is only one upper arm and one lower arm, and so both springs 60, 62 cannot be formed on opposite sides of the same sheet or plate (that is, one cannot form four such springs in total). In the illustrative mid-straps $44_M$ this is addressed by deforming the upper and lower springs 60, 62 in opposite directions, so that the upper spring 60 acts on one cell (e.g., the cell to the left of the mid-strap $44_M$ in the example of FIG. 6) while the lower spring 62 acts on the other cell (e.g., the cell to the right of the mid-strap $44_M$ in the example of FIG. 6).

The mid-strap $44_M$ of FIGS. 6 and 7 provides only one point of support (either an upper spring 60 or a lower spring 62, but not both). However, the fuel rod remains supported at seven points (four dimples and three springs). The four center cells would have only six points of support; however, in some embodiments these cells are replaced by a central guide tube 72 (shown in phantom in FIG. 7). More generally, it is to be appreciated that typically some of the cells 70, or groups of cells 70, are replaced by guide tubes which are not shown in FIG. 7. Such guide tubes may be used for various purposes, such as providing conduits for control rods, conduits for instrumentation, or so forth. The strap portions surrounding a guide tube optionally do not include springs or dimples, and omitting these elements around the guide tubes enhances the overall strength of the spacer grid. In some embodiments strap portions surrounding a guide tube (that is, a guide tube "cell") include saddle features (not shown) that position the guide tube accurately without generating substantial clamping force. Integral tabs on the top and bottom edges of the interior grid straps 44 in these special cells are optionally used to permanently attach the spacer grid to the control rod guide tube during fuel assembly manufacturing. This direct mechanical connection can be made using pulse arc welding, electrical resistance welding, or so forth.

Figure 8:
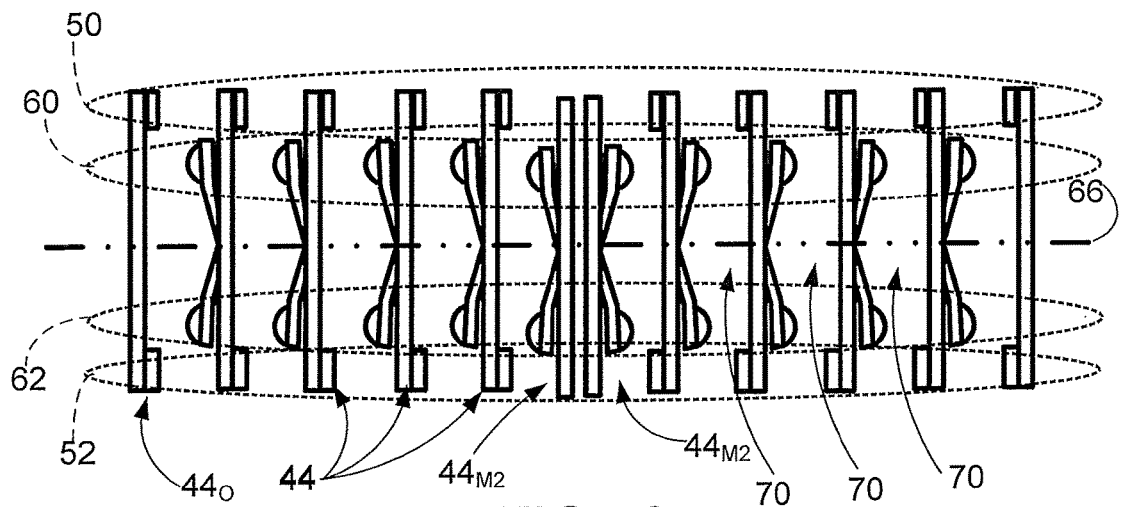
FIGS. 8 and 9 illustrate a second spacer grid embodiment.
Figure 9:
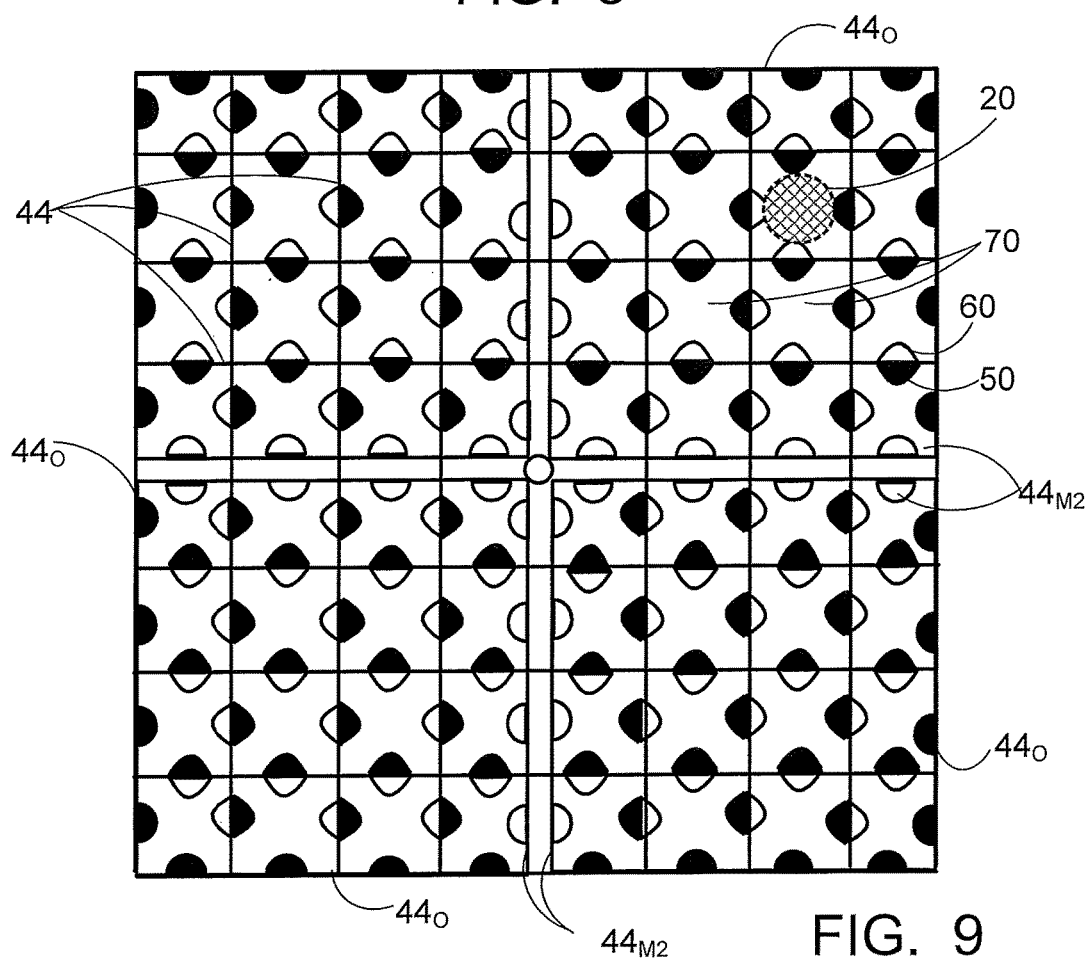

With reference to FIGS. 8 and 9, in an alternative approach two all-spring (no dimple) interior straps $44_{M2}$ arranged in a back-to-back configuration can be used instead of the alternating-spring mid-strap $44_M$. This arrangement provides full eight-point (i.e., four dimples and four springs) contact for the cells bordered by the mid-straps $44_{M2}$ (as compared with only seven-point or even six-point support in the embodiment of FIGS. 6 and 7). The back-to-back mid-straps $44_{M2}$ is also expected to provide some enhancement of the strength of the spacer grid. The back-to-back mid-straps $44_{M2}$ may have their backs in direct contact, or may be slightly spaced apart (as shown in FIGS. 8 and 9).

Another option for the mid-strap, which could replace either the mid-strap $44_M$ of FIGS. 6 and 7 or the back-to-back mid-straps $44_{M2}$ of FIGS. 8 and 9 is a mid-strap with double dimples (not shown). Both sets of dimples could be formed from a single mid-strap sheet or plate, and would have the same contours as the existing interior strap dimples. This approach avoids the unique strap fabrication die and flow diversion issues of the double mid-strap $44_{M2}$ of FIGS. 8 and 9, and the partial support issue of the mid-strap $44_M$ of FIGS. 6 and 7. However, this approach would entail reversing the positioning of the springs and dimples—that is, the springs would be on the outboard walls of the cells (with the springs facing inward) and the dimples would be on the inboard walls (and facing outward). This would place springs on the outermost straps, which is expected to weaken the spacer grid, decrease its impact strength, and make the grid more susceptible to hang-up and tearing during fuel handling.

Figure 10:
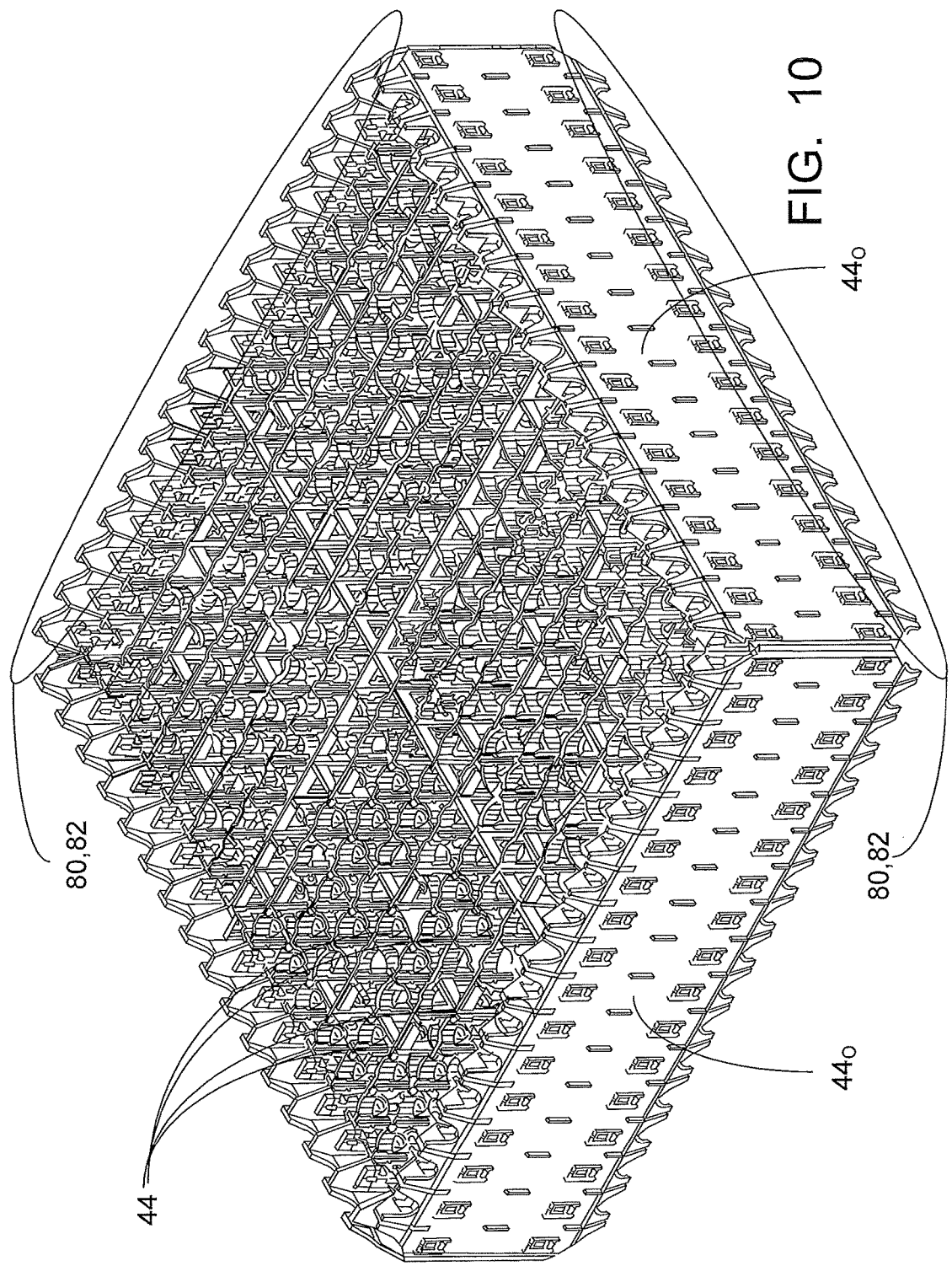
FIGS. 10-12 illustrate a third spacer grid embodiment.
Figure 11:
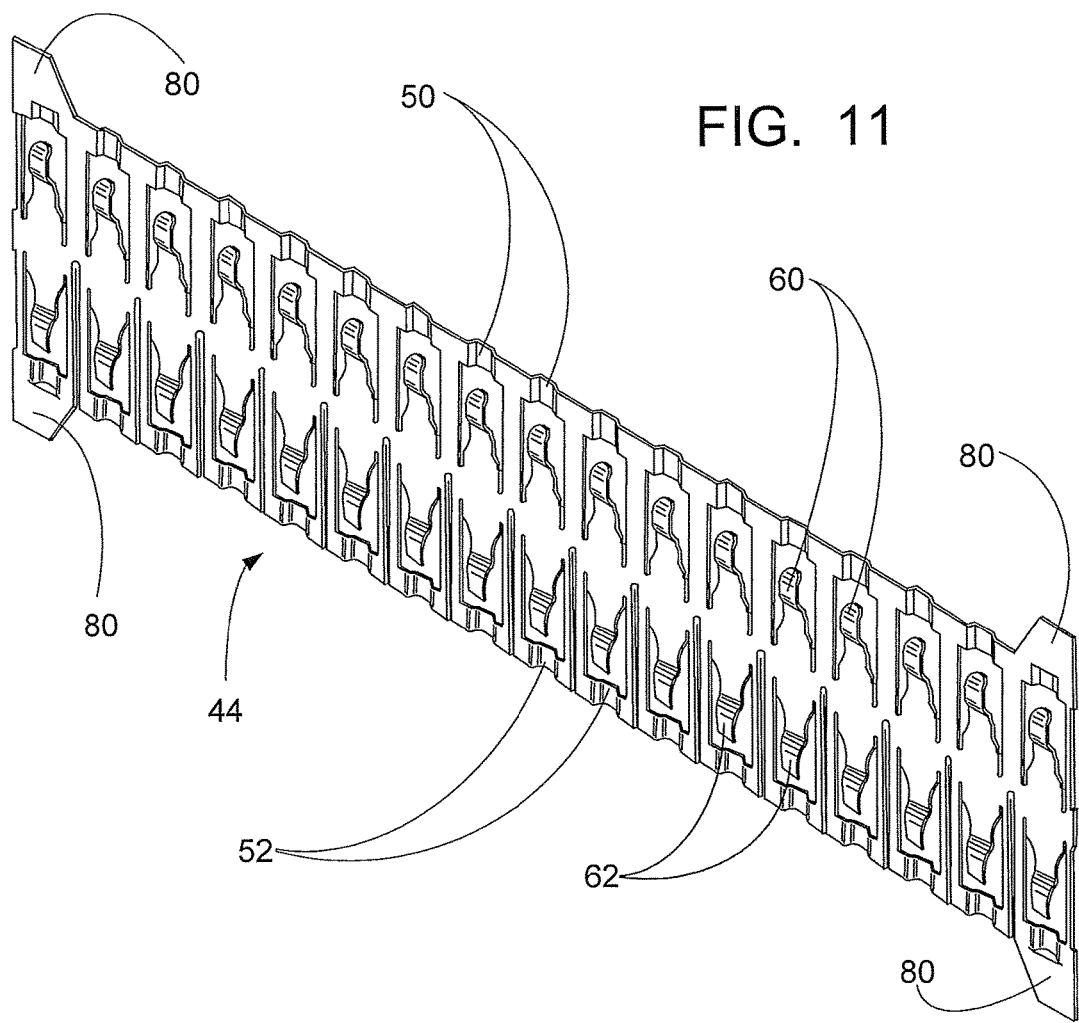
Figure 12:
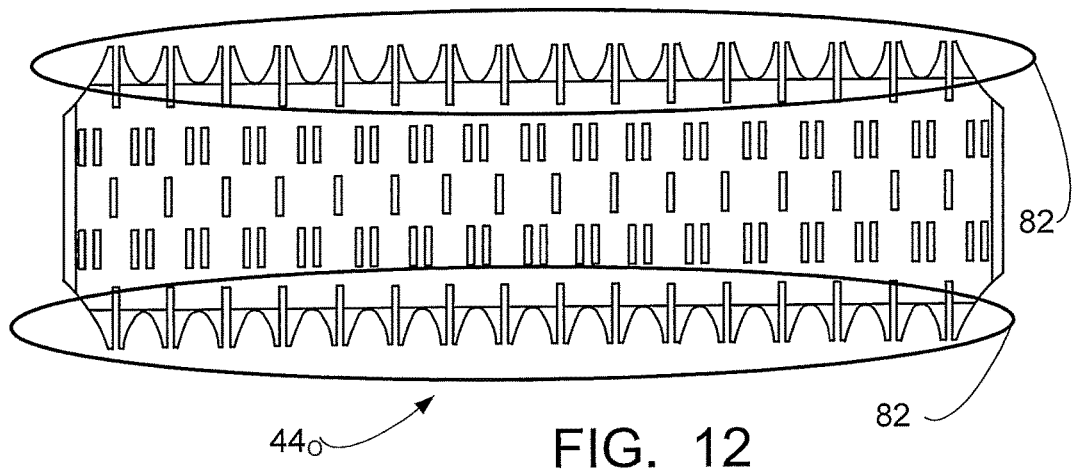

With reference to FIGS. 10-12, an illustrative embodiment is shown which includes structures on the outermost straps $44_O$ that enhance structural strength of the spacer grid. Toward this end, the interior grid straps 44 include gussets 80 at their outboard ends that interface with lead-in tabs 82 disposed on the outer straps $44_O$. These features 80, 82 stabilize the ends of the interior grid straps 44 during any lateral impact on the fuel assembly such as may occur during seismic events or shipment. These features 80, 82 also help support the outer strap lead-in during fuel handling when one fuel assembly is riding up or down along its neighbors in the core. As with the embodiments of FIGS. 3-9, in the interior straps 44 the strap portions surrounding each cell contain the dimple features 50, 52 at the top and bottom edges, respectively, sandwiched around the pair of vertically-oriented cantilever spring features 60, 62.

With reference to FIGS. 13-18, some features optionally included on the dimples 50, 52 and springs 60, 62 are illustrated. FIG. 13 shows a corner of an end-grid 30 with the extreme corner cell cut away to reveal interior strap portions defining that removed corner cell. FIG. 14 shows a perspective view of one of the dimples 50, 52, which is horizontally oriented. FIG. 15 shows an edge profile of the springs 60, 62 of the end-grid 30. Similarly, FIG. 16 shows a corner of a mid-grid 32 with the extreme corner cell cut away to reveal interior strap portions defining that removed corner cell. FIG. 17 shows a perspective view of a dimple $502_V$ of the outermost strap, which in this case is vertically oriented. FIG. 18 shows an edge profile of the springs 60, 62 of the mid-grid 32.

With particular reference to FIGS. 13-15, the dimples 50, 52 are horizontally-oriented (see especially FIG. 14). The cantilever spring features 60, 62, have a large elastic deflection range due to the cantilevering arrangement. The springs 60, 62 are formed with their main surfaces inclined relative to the remainder of the vertical cell wall 84 (diagrammatically shown by a vertical dashed line in FIG. 15) so as to create a substantial interference with the fuel rod. When the fuel rod is inserted into the spacer grid during manufacturing, these dual spring features 60, 62 are elastically deflected back towards the vertical cell wall 84, creating a clamping force that pins the fuel rod against the opposing dimple pair 50, 52. This same clamping action is simultaneously actuated at 90° around the cladding by the spring and dimple features in the perpendicular cell walls.

Because the rod contact surfaces on the springs 60, 62 are at the top and bottom ends of the respective upper and lower springs 60, 62, the four spring features in the cell bear on the fuel rod cladding in horizontal planes that are nearly coplanar with the opposing dimple features 50, 52. This mechanical arrangement generates the maximum restoring moment on the fuel rod for a given spring clamping force (because the moment arm is maximized in the cantilevered arrangement) while minimizing the local bending moment (due to the cooperating dimple/spring arrangements being co-planar) that can induce rod bow between grids.

Integral lead-in surfaces are provided at the top and bottom edges of the dimples 50, 52 and springs 60, 62 to facilitate fuel rod insertion both during manufacturing in the factory and during fuel reconstitution in the field. The lead-in surfaces on the dimples 50, 52 are formed by coining the top and bottom edges of the formed dimples 50, 52 at an angle. In the end-grid 30 of FIGS. 13 and 15, the lead-in surfaces on the springs 60, 62 comprise three-dimensional flat-topped domes 90. The dome provides a low likelihood of fuel rod hang-up during insertion, and the flat top of the dome spreads out cladding wear.

In the embodiment of FIGS. 13-18, the end grids 30 (FIGS. 13-15) are suitably made of Inconel while the mid-grids 32 (FIGS. 16-18) are suitably made of Zircaloy. Inconel is a more ductile material than Zircaloy, but Zircaloy is preferable for the mid-grids 32 due to its smaller neutron absorption cross-section as compared with Inconel. The Inconel end grids 30 shown in FIGS. 13-15 employ the flat-topped domes 90 as the lead-in/fuel rod engagement surfaces for the springs 60, 62. On the other hand, yield in forming these flat-topped domes 90 in the more brittle Zircaloy material is expected to be low, as the Zircaloy sheet or plate tends to tear or develop an orange-peel defect when formed in three dimensions.

Accordingly, in the Zircaloy mid-grids 32 of FIGS. 16-18, the lead-in/fuel rod engagement surfaces for the springs 60, 62 are constructed as shallow two-dimensional hooks 92 (see especially FIGS. 16 and 18). These hooks 92 are suitably formed by bending the free ends of the springs 60, 62 so as to include a flat rod engagement portion and a distal "bent-back" portion that facilitates lead-in. In the case of either the flat-topped domes 90 or the hooks 92, these lead-in features work in conjunction with a bullet-shaped bottom end plug shape of the fuel rod to reduce the likelihood of hang-up during rod insertion.

In the embodiments of FIGS. 13-18, the outermost straps $44_O$ of the spacer grids 30, 32 again contain only dimples, but not springs. This configuration reduces the amount of material that is cut away in forming the outermost straps $44_O$. Grid impact behavior is heavily influenced by the strength of the outermost straps, and strong outermost straps that are structurally stable are advantageous for achieving high lateral impact strength. The lead-in features 80, 82 described with reference to FIGS. 10-12 are incorporated in modified form into the embodiments of FIGS. 13-18. In these latter embodiments the gussets 80 are omitted on the interior straps 44, and the lead-in tabs 82 disposed on the outermost straps $44_O$ engage the corners of the interior straps 44. In all of the embodiments of FIGS. 10-18, these engagements serve a stiffening function. They increase the effective moment of inertia of the outer strap $44_O$ while also helping to stabilize the ends of the interior straps 44.

In the mid-grids 32 of FIGS. 16-18, the dimples on the outermost straps $44_O$ are modified to further enhance the strength of these outermost straps $44_O$. Specifically, the horizontally oriented dimples 50, 52 (see, e.g. FIGS. 13 and 15) are replaced by vertically oriented dimples $502_V$ in the outermost straps $44_O$ of the mid-grid 32 of FIGS. 16-18 (see especially FIGS. 16 and 17). The vertically oriented dimples $502_V$ are less favorable from the point of view of pressure drop. However, they eliminate four lines of weakness along the length of the outermost strap $44_O$ that are present in the case of the horizontally-oriented dimples 50, 52. The use of the vertically oriented dimples $502_V$ in the case of the mid-grids 32 is an accommodation to the lower strength of the Zircaloy construction material. The end-grids 30 (FIGS. 13-15) are constructed of stronger Inconel material, and accordingly the outermost straps $44_O$ of the end-grids 30 use the horizontally oriented dimples 50, 52 in the illustrative embodiment of FIGS. 13-15.

The spacer grids of FIGS. 10-18 can employ any suitable arrangement for the mid-strap, such as the illustrative "alternating spring" mid-strap $44_M$ of FIGS. 6 and 7, or the back-to-back mid-straps $44_{M2}$ of FIGS. 8 and 9. In the latter case, the back-to-back mid-straps $44_{M2}$ occupy additional lateral space, and accordingly the spring lead-in features may need to be made shallower for these mid-straps $44_{M2}$ in order to leave sufficient room for insertion of the fuel rods into the proximate cells.

In the disclosed embodiments, once the fuel rod is installed the major portion of the length of the cantilevered springs 60, 62 is oriented essentially vertically (e.g., parallel with the vertical wall 84 in FIGS. 15 and 18), thereby presenting a limited frontal area to the coolant flow. The horizontal orientation of the dimples 50, 52 likewise presents a limited frontal area to the flow. The illustrative spacer grids also do not include flow mixing vanes on the interior grid straps 44. Accordingly, the pressure drop across the spacer grid is limited. Spacer grids with reduced pressure drop, such as those disclosed herein, are of particular value in the context of nuclear reactors that employ natural circulation or assisted or forced circulation with a relatively low flow rate, such as small modular reactor (SMR) designs which are typically designed to produce 300 megawatts or less of electrical power.

The dual cantilever springs 60, 62 rotate so as to bring the contact surface (e.g., the flat-topped dome 90 or hook 92 in two illustrative embodiments) into an approximately line contact with the fuel rod cladding. The illustrative contact surfaces 90, 92 each provide a long "flat" to maximize the contact length and spread out any cladding wear that might occur at this interface. In the case of the flat-topped dome 90, this flat is the flat top of the dome, while in the case of the hook 92 a portion of the hook structure is made flat. Likewise, the dimples 50, 52 are suitably fabricated with a long flat region between the coined lead-ins to provide a line contact with the fuel rod cladding to maximize the contact length and spread out any cladding wear that might occur at that interface. The contour of all of the contact surfaces is so formed as to rapidly increase the wear area as metal is removed, so as to compensate for any alignment imperfections that might exist at the cladding-to-grid interfaces. When combined with the two "extra" contact surfaces that the dual cantilever spring arrangement provides, the disclosed spacer grids have a large metal volume removed-to-depth of penetration ratio, thus providing good contact with the fuel rods without unduly compromising overall strength of the spacer grid.

Figure 19:
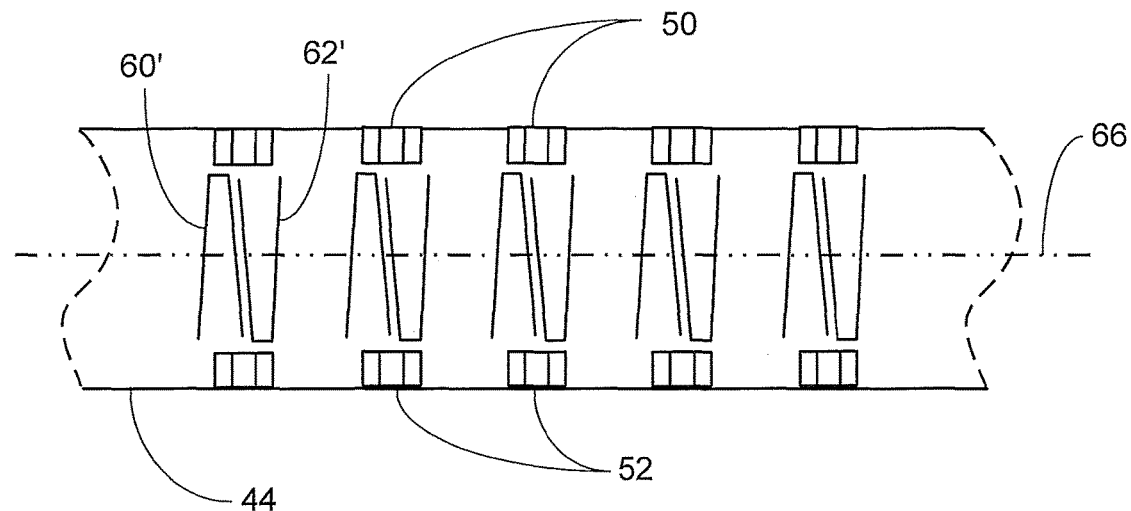
FIGS. 19 and 20 show two alternative geometries for the upper and lower cantilevered springs.
Figure 20:
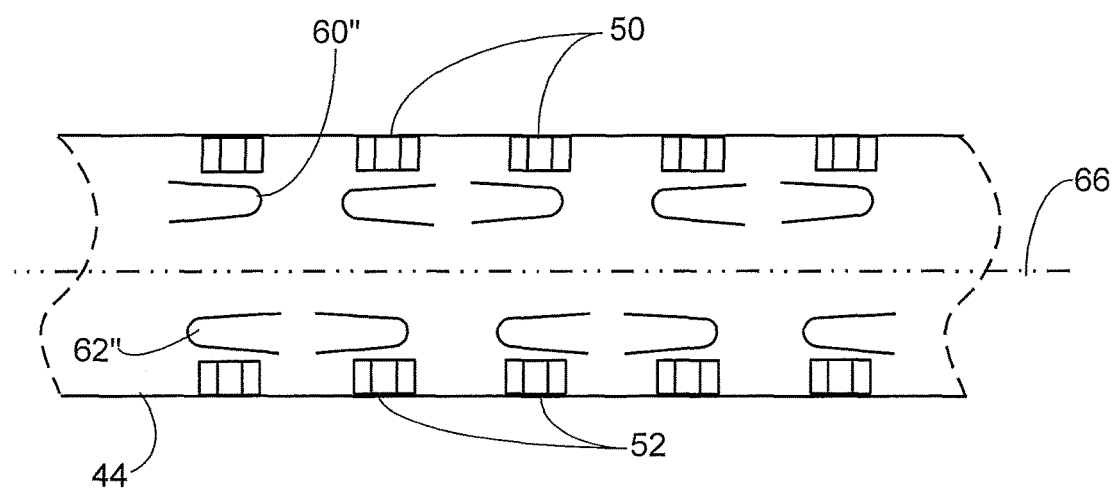

With reference to FIGS. 19 and 20, the dual cantilever design can employ different configurations. FIG. 19 shows an embodiment in which the cantilevers are elongated to be side-by-side. Thus, upper springs 60' have their anchors below the mid-plane 66 of the spacer grid and their cantilevered engagement surface above the mid-plane 66; while, lower springs 62' have their anchors above the mid-plane 66 of the spacer grid and their cantilevered engagement surface below the mid-plane 66. The orientation of the two springs 60', 62' in any given cell alternates such that the root or anchor of the upper spring 60' is positioned at the same elevation as the thin hook (or flat-topped dome, or other engagement surface) on the adjacent lower spring 62'. This allows the dual springs 60', 62' to be nested into less space on the strap 44. FIG. 20 shows an embodiment in which upper and lower springs 60", 62" are oriented horizontally. The orientation of the two springs 60", 62" in any given cell alternates such that the root or anchor of the upper spring 60" is positioned vertically above the hook (or flat-topped dome or other engagement surface) of the lower spring 62", again enabling nesting into a smaller space on the strap 44. The vertical stacking of the springs 60", 62" is reversed from cell to cell to balance the twisting moments applied to the interior grid straps.

The illustrative spacer grids have square or rectangular symmetry in a plane transverse to the fuel rods. However, various disclosed aspects are readily incorporated into spacer grids of other geometries, such as hexagonal spacer grids having hexagonal symmetry in a plane transverse to the fuel rods.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. A spacer grid comprising:
    interlocked straps comprising metal sheets or plates welded together to define a spacer grid having a top and bottom, the interlocked straps defining a plurality of cells comprising vertical passages connecting the top and bottom of the spacer grid, the cells including:
        upper dimples disposed proximate to the top of the spacer grid and distal from a mid-plane of the spacer grid,
        lower dimples disposed proximate to the bottom of the spacer grid and distal from the mid-plane of the spacer grid,
        cantilevered upper springs having fuel rod engagement surfaces disposed proximate to the top of the spacer grid and distal from the mid-plane of the spacer grid, and
        cantilevered lower springs having fuel rod engagement surfaces disposed proximate to the bottom of the spacer grid and distal from the mid-plane of the spacer grid,
    wherein the upper springs and the lower springs are anchored to the straps by a single base that is in a plane of its corresponding strap at the mid-plane of the spacer grid.

2. The spacer grid of claim 1, wherein the fuel rod engagement surfaces of the cantilevered upper and lower springs comprise flat topped domes.

3. The spacer grid of claim 1, wherein the fuel rod engagement surfaces of the cantilevered upper and lower springs comprise hooks.

4. The spacer grid of claim 1, wherein the outermost straps of the interlocked straps do not include cantilevered upper springs and do not include cantilevered lower springs.

5. The spacer grid of claim 4, wherein the outermost straps of the interlocked straps have the same thickness as the other straps.

6. The spacer grid of claim 1, wherein the upper and lower dimples face inward toward the center of the spacer grid and the upper and lower springs face outward away from the center of the spacer grid.

7. The spacer grid of claim 1, wherein each cell configured to receive a fuel rod includes:
    a first cell defining wall having upper and lower dimples;
    a second cell defining wall having upper and lower dimples;
    a third cell defining wall opposite from and facing the first cell defining wall wherein the third cell defining wall has upper and lower springs; and
    a fourth cell defining wall opposite from and facing the second cell defining wall wherein the fourth cell defining wall has upper and lower springs.

8. The spacer grid of claim 7, wherein the first and second cell defining walls face toward the center of the spacer grid and the third and fourth cell defining walls face away from the center of the spacer grid.

9. A spacer grid comprising:
    interlocked straps of metal sheets or plates welded together to form a spacer grid having a top and bottom, the interlocked straps defining a plurality of cells comprising vertical passages connecting the top and bottom of the spacer grid; and
    a fuel rods retention system comprising a set of dimples protruding from walls of the cells and a set of springs protruding from walls of the cells, the set of dimples not including any dimples configured to contact fuel rods at the mid-plane of the spacer grid, the set of springs not including any springs configured to contact fuel rods at a mid-plane of the spacer grid,
    wherein the set of springs is anchored to the straps by a single base that is in a plane of its corresponding strap at the mid-plane of the spacer grid.

10. The spacer grid of claim 9, wherein the set of dimples includes:
    a set of upper dimples configured to contact fuel rods above the mid-plane of the spacer grid; and
    a set of lower dimples configured to contact fuel rods below the mid-plane of the spacer grid.

11. The spacer grid of claim 10, wherein the set of springs includes:
    a set of upper springs configured to contact fuel rods above the mid-plane of the spacer grid; and
    a set of lower springs configured to contact fuel rods below the mid-plane of the spacer grid.

* * * * *